US012608957B2

(12) United States Patent　(10) Patent No.: US 12,608,957 B2
Miyazato　(45) Date of Patent: Apr. 21, 2026

(54) DEVICE, METHOD, AND STORAGE MEDIUM FOR DETECTING DECELERATION OF PRECEDING VEHICLE

(71) Applicant: TOYOTA JIDOSHA KABUSHIKI KAISHA, Toyota (JP)

(72) Inventor: Kazuhiro Miyazato, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 333 days.

(21) Appl. No.: 18/359,972

(22) Filed: Jul. 27, 2023

(65) Prior Publication Data

US 2024/0127605 A1　Apr. 18, 2024

(30) Foreign Application Priority Data

Oct. 12, 2022　(JP) ................................ 2022-164273

(51) Int. Cl.
*G06V 20/56*　(2022.01)
*B60W 40/105*　(2012.01)

(52) U.S. Cl.
CPC .........　*G06V 20/588* (2022.01); *B60W 40/105* (2013.01); *B60W 2420/403* (2013.01); *B60W 2554/20* (2020.02)

(58) Field of Classification Search
CPC ... G06V 20/588; G06V 20/58; B60W 40/105; B60W 2420/403; B60W 2554/20; G08G 1/052; G08G 1/0175
See application file for complete search history.

(56) References Cited

U.S. PATENT DOCUMENTS

| | | | |
|---|---|---|---|
| 5,874,904 A | * | 2/1999 | Hirabayashi ............ G01S 11/12 |
| | | | 348/148 |
| 8,355,851 B2 | | 1/2013 | Inoue et al. |
| 8,370,040 B2 | | 2/2013 | Inoue et al. |
| 8,417,430 B2 | | 4/2013 | Saeki |
| 8,548,709 B2 | | 10/2013 | Morita |
| 8,768,597 B2 | | 7/2014 | Kagawa |
| 9,174,643 B2 | | 11/2015 | Aso |
| 10,017,178 B2 | | 7/2018 | Morimoto et al. |
| 10,118,617 B2 | | 11/2018 | Urano et al. |
| 10,486,698 B2 | | 11/2019 | Masui et al. |
| 12,211,231 B1 | * | 1/2025 | Zheng ........................ G06T 7/20 |

(Continued)

FOREIGN PATENT DOCUMENTS

| | | | | |
|---|---|---|---|---|
| EP | | 1055939 A2 | * 11/2000 | ........... G01S 13/931 |
| JP | | H09-267686 A | 10/1997 | |

(Continued)

*Primary Examiner* — Solomon G Bezuayehu
(74) *Attorney, Agent, or Firm* — SoraIP, Inc.

(57) ABSTRACT

The apparatus of the present disclosure detects a preceding vehicle and a white dashed line provided at regular intervals along a road from an image captured by a monocular camera. In addition, the apparatus of the present disclosure acquires speed information of the host vehicle. Then, the apparatus of the present disclosure counts the number of white dashed lines included in the section from the vertical position of the preceding vehicle to the lower fixed reference position of the vertical position in the camera image, and detects the deceleration of the preceding vehicle based on the time-series transition of the number of white dashed lines and the speed information of the host vehicle.

4 Claims, 5 Drawing Sheets

(56)  References Cited

U.S. PATENT DOCUMENTS

| | | | |
|---|---|---|---|
| 2004/0085197 A1* | 5/2004 | Watanabe | B60W 40/064 |
| | | | 701/96 |
| 2005/0220538 A1* | 10/2005 | Van Der Poel | E01F 9/582 |
| | | | 404/14 |
| 2007/0024429 A1* | 2/2007 | Song | G08G 1/167 |
| | | | 340/435 |
| 2008/0042894 A1* | 2/2008 | Kikuchi | G01S 7/411 |
| | | | 342/70 |
| 2012/0185167 A1* | 7/2012 | Higuchi | G06V 20/588 |
| | | | 382/104 |
| 2013/0209968 A1* | 8/2013 | Miller | G09B 9/052 |
| | | | 434/65 |
| 2017/0057528 A1* | 3/2017 | Green | B61L 25/025 |
| 2017/0371347 A1* | 12/2017 | Cohen | G05D 1/0088 |
| 2018/0178802 A1* | 6/2018 | Miyata | B60W 30/095 |
| 2018/0286242 A1* | 10/2018 | Talamonti | B60K 35/23 |
| 2019/0196184 A1* | 6/2019 | Takizawa | G01C 21/365 |
| 2019/0295419 A1 | 9/2019 | Tosa et al. | |
| 2021/0237758 A1* | 8/2021 | Wang | B60W 40/10 |
| 2022/0024492 A1* | 1/2022 | Panttila | B60W 60/0016 |
| 2023/0036783 A1* | 2/2023 | Sakuma | B60W 30/16 |
| 2024/0246548 A1* | 7/2024 | Akamine | G01S 13/56 |

FOREIGN PATENT DOCUMENTS

| | | | |
|---|---|---|---|
| JP | 3390515 | B2 * | 3/2003 |
| JP | 2004299554 | A * | 10/2004 |
| JP | 2009074888 | A * | 4/2009 |

* cited by examiner

DISTANT AREA ⇒
ESTIMATED FROM THE RECOGNITION
RESULT OF THE SHORT DISTANCE

4

6L     6R

BLUR ⇒
INTERPOLATION FROM
THE FRONT AND REAR
WHITE DASHED LINES

4

$6R_{i-1}$ $6R_i$

6L

6R $6R_{i+1}$

ESTIMATED BY
THE CORRESPONDING
WHITE DASHED LINE

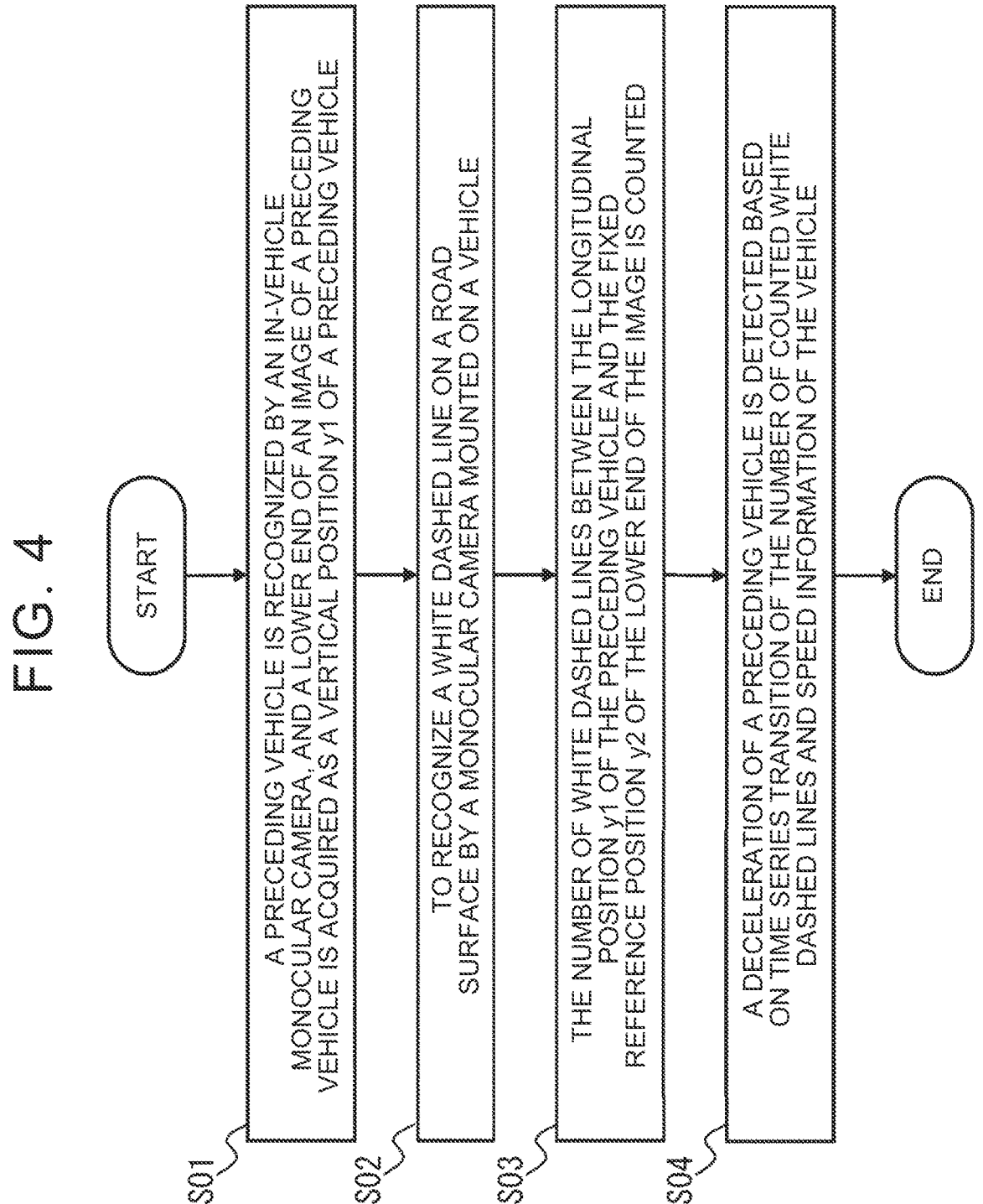

START

S01 — A PRECEDING VEHICLE IS RECOGNIZED BY AN IN-VEHICLE MONOCULAR CAMERA, AND A LOWER END OF AN IMAGE OF A PRECEDING VEHICLE IS ACQUIRED AS A VERTICAL POSITION y1 OF A PRECEDING VEHICLE

S02 — TO RECOGNIZE A WHITE DASHED LINE ON A ROAD SURFACE BY A MONOCULAR CAMERA MOUNTED ON A VEHICLE

S03 — THE NUMBER OF WHITE DASHED LINES BETWEEN THE LONGITUDINAL POSITION y1 OF THE PRECEDING VEHICLE AND THE FIXED REFERENCE POSITION y2 OF THE LOWER END OF THE IMAGE IS COUNTED

S04 — A DECELERATION OF A PRECEDING VEHICLE IS DETECTED BASED ON TIME SERIES TRANSITION OF THE NUMBER OF COUNTED WHITE DASHED LINES AND SPEED INFORMATION OF THE VEHICLE

END

DEVICE, METHOD, AND STORAGE MEDIUM FOR DETECTING DECELERATION OF PRECEDING VEHICLE

CROSS-REFERENCE TO RELATED APPLICATION

This application claims priority to Japanese Patent Application No. 2022-164273 filed on Oct. 12, 2022 incorporated herein by reference in its entirety.

BACKGROUND

1. Technical Field

The present disclosure relates to a technique for detecting deceleration of a preceding vehicle, and more particularly, to a technique suitable for use in a vehicle equipped with a monocular camera.

2. Description of Related Art

Japanese Unexamined Patent Application Publication No. 9-267686 (No. 9-267686 A) discloses that lighting of a brake lamp in a preceding vehicle is detected by recognition processing of a front image captured by an in-vehicle camera, and deceleration of the preceding vehicle is predicted from the lighting of the brake lamp.

SUMMARY

However, it is not always successful to detect the lighting of the brake lamp of the preceding vehicle from the image captured by the in-vehicle camera. For example, the presence of the sun behind an own vehicle makes it difficult to detect the lighting of the brake lamp due to the reflection of sunlight. Further, the brake lamp is not necessarily lit when the preceding vehicle decelerates. For example, due to an engine brake or uphill, the vehicle decelerates even though the brake lamp is not lit. Conversely, there may be a case where the preceding vehicle does not decelerate even though the brake lamp is lit because a brake pedal has play.

An in-vehicle cameras includes a stereo camera and a monocular camera. The stereo camera can detect a change in a distance of the preceding vehicle with respect to the own vehicle. Therefore, when the in-vehicle camera is a stereo camera, it is possible to easily detect the deceleration of the preceding vehicle without relying on the detection of the lighting of the brake lamp. However, since the stereo camera is more expensive than the monocular camera, a vehicle that can be equipped with the stereo camera is limited. In order to improve safety in more vehicles, it is desired to be able to detect the deceleration of the preceding vehicle without relying on the detection of the lighting of the brake lamp even in a vehicle that is not equipped with an expensive sensor such as the stereo camera.

The present disclosure has been made in view of the above issues. One object of the present disclosure is to enable the detection of the deceleration of the preceding vehicle without relying on the detection of the lighting of the brake lamp of the preceding vehicle in a vehicle equipped with the monocular camera.

The present disclosure provides a device for achieving the above object. The device according to the present disclosure includes:

a monocular camera that captures an image of an area forward of an own vehicle;

a processor; and a memory that is coupled to the processor and that stores a plurality of instructions.

The instructions are configured to cause the processor to execute first to fifth processes described below.

A first process is detecting a preceding vehicle from a camera image captured by the monocular camera.

A second process is detecting equally spaced stationary objects equally spaced along a road from the camera image.

A third process is acquiring speed information of the own vehicle.

A fourth process is counting the number of the equally spaced stationary objects included in a section from a longitudinal position of the preceding vehicle to a fixed reference position below the longitudinal position in the camera image.

A fifth process is detecting deceleration of the preceding vehicle based on time-series transition of the number of the equally spaced stationary objects and the speed information of the own vehicle.

Further, the present disclosure provides a method for achieving the above object. The method according to the present disclosure is a method executed by an in-vehicle computer, and includes first to fifth steps described below.

A first step is detecting a preceding vehicle from a camera image of an area forward of an own vehicle captured by a monocular camera mounted on the own vehicle.

A second step is detecting equally spaced stationary objects equally spaced along a road from the camera image.

A third step is acquiring speed information of the own vehicle.

A fourth step is counting the number of the equally spaced stationary objects included in a section from a longitudinal position of the preceding vehicle to a fixed reference position below the longitudinal position in the image.

A fifth step is detecting deceleration of the preceding vehicle based on time-series transition of the number of the equally spaced stationary objects and the speed information of the own vehicle.

Further, the present disclosure provides a storage medium storing a program for achieving the above object. The storage medium according to the present disclosure is configured to store the program for causing an in-vehicle computer to execute first to fifth steps described below.

A first step is detecting a preceding vehicle from a camera image of an area forward of an own vehicle captured by a monocular camera mounted on the own vehicle.

A second step is detecting equally spaced stationary objects equally spaced along a road from the camera image.

A third step is acquiring speed information of the own vehicle.

A fourth step is counting the number of the equally spaced stationary objects included in a section from a longitudinal position of the preceding vehicle to a fixed reference position below the longitudinal position in the image.

A fifth step is detecting deceleration of the preceding vehicle based on time-series transition of the number of the equally spaced stationary objects and the speed information of the own vehicle.

The program according to the present disclosure is recorded in a computer-readable recording medium.

When the equally spaced stationary objects are displayed in the camera image captured by the monocular camera together with the preceding vehicle, the distance between the own vehicle and the preceding vehicle can be measured by counting the number of the equally spaced stationary objects included in the section from the longitudinal position of the preceding vehicle to the fixed reference position in the camera image. By considering the speed information of the own vehicle in addition to the time-series transition of the number of the equally spaced stationary objects, the speed information of the preceding vehicle can be obtained from these kinds of information. The speed information of the preceding vehicle that can be acquired includes the deceleration of the preceding vehicle. Therefore, with the technique according to the present disclosure, in the vehicle equipped with the monocular camera, it is possible to detect the deceleration of the preceding vehicle without relying on the detection of the lighting of the brake lamp of the preceding vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a flowchart illustrating a method of detecting deceleration of a preceding vehicle according to an embodiment of the present disclosure.

DETAILED DESCRIPTION OF EMBODIMENTS

1. Method for Detecting a Deceleration of a Preceding Vehicle

Figure 1:
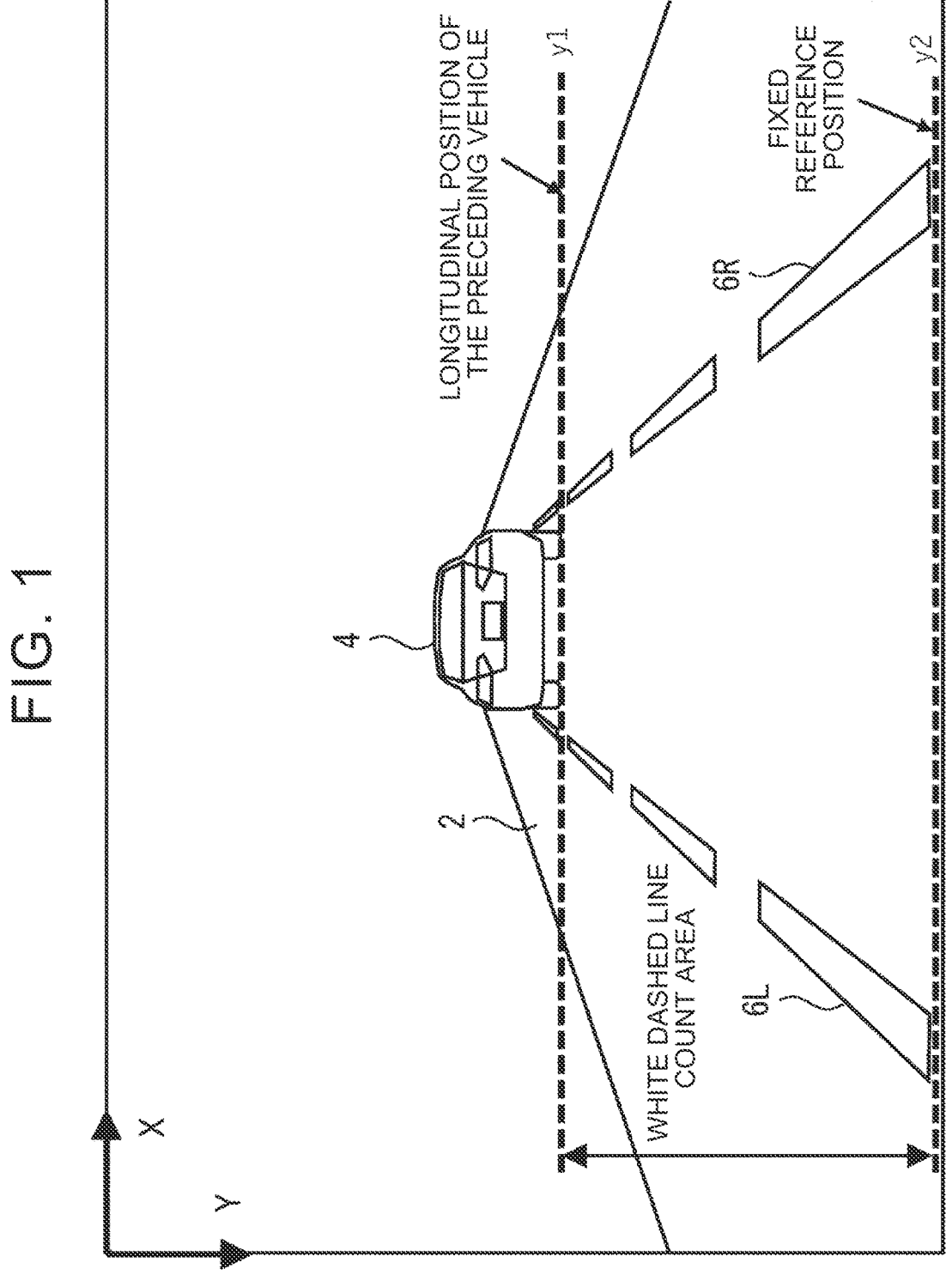
FIG. 1 is a diagram illustrating an outline of a method for detecting deceleration of a preceding vehicle according to an embodiment of the present disclosure.

An outline of a method for detecting deceleration of a preceding vehicle according to an embodiment of the present disclosure (hereinafter, referred to as a method according to the present embodiment) will be described with reference to FIG. 1. FIG. 1 shows an image of a forward field of view of an own vehicle captured by an in-vehicle monocular camera. The images show two white dashed lines 6L, 6R drawn on the road 2. The white dashed line 6L, 6R is a lane border line that defines a lane on which the host vehicle is traveling. The images show the preceding vehicle 4 traveling in front of the host vehicle in the lane defined by the white dashed line 6L, 6R.

In the image, two dotted lines are drawn in the lateral direction (X direction). The dotted line on the upper side is a line indicating the lower end of the preceding vehicle 4 in the vertical direction (Y direction) of the image. In the present embodiment, the position y1 of the lower end of the preceding vehicle 4 in the longitudinal direction is defined as the longitudinal position of the preceding vehicle 4. The lower dotted line is a line indicating the lower end of the image in the vertical direction. In the present embodiment, the position y2 of the lower end of the images in the vertical direction is defined as a fixed reference position.

The white dashed line 6L, 6R is an equidistant stationary object provided at regular intervals along the road 2. By counting the number of the white dashed lines 6L, 6R included in the area from the fixed reference position y2 to the vertical position y1 of the preceding vehicle 4, it is possible to measure the distance from the host vehicle to the preceding vehicle 4. Hereinafter, an area from the fixed reference position y2 to the vertical position y1 is referred to as a white dashed line counting area. In the methods according to the present embodiment, the number of white dashed line 6L, 6R included in the white dashed line count area is counted.

Figure 2A:
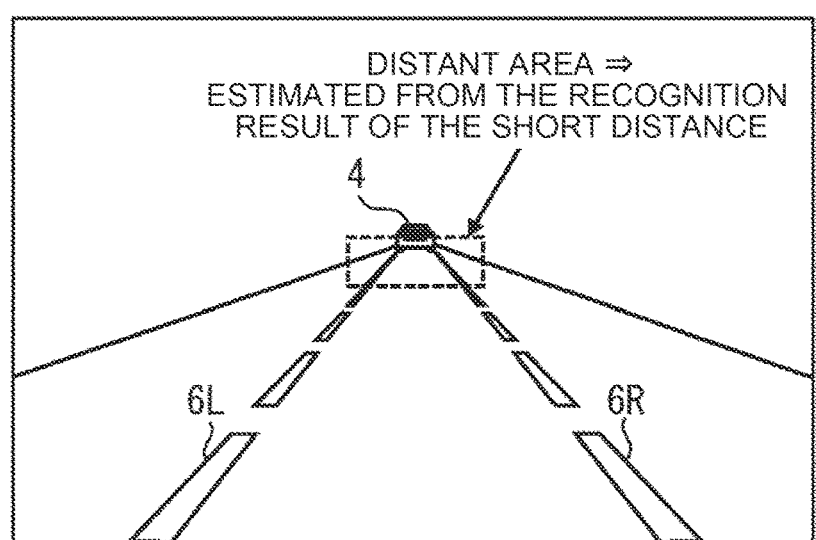
FIG. 2A is a diagram illustrating a method of counting a white dashed line in a distant area.
Figure 2B:
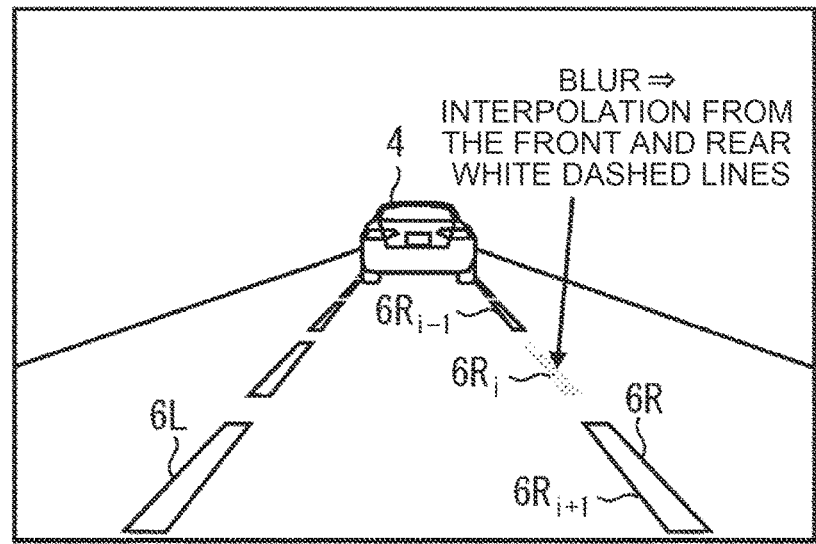
FIG. 2B is a diagram illustrating a method of counting a blurred white dashed line.
Figure 2C:
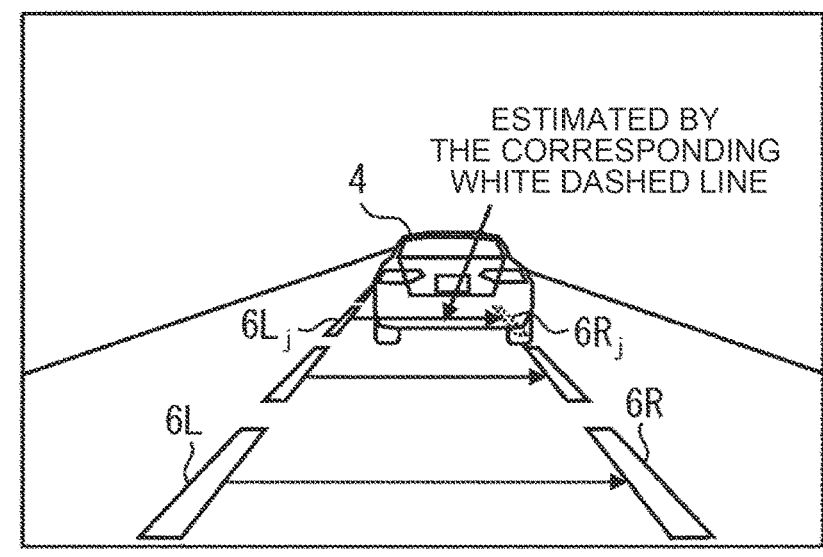
FIG. 2C is a schematic diagram illustrating a method of counting white dashed lines hidden below a preceding vehicle.

In the embodiment illustrated in FIG. 1, the number of the white dashed line 6L, 6R included in the white dashed line counting area is six. However, the number of white dashed lines 6L, 6R cannot be counted clearly at all times. For example, as shown in FIG. 2A, when the preceding vehicles 4 are traveling far away, it is difficult to distinguish and recognize each of the white dashed line 6L, 6R in the far area. In this case, the number of the white dashed line 6L, 6R in the distant area is estimated based on the recognition of the white dashed line 6L, 6R in the short distance. In addition, as shown in FIG. 2B of the drawing, a part of the white dashed line 6R, may not be blurred. However, since the white dashed line 6L, 6R is sized by the standard, the white dashed line 6R, that is not visible can be interpolated from the white dashed line $6R_{i-1}$, $6R_{i+1}$ before and after it. As shown in FIG. 2C, the white dashed line $6R_j$ hidden below the preceding vehicle 4 can be estimated from the contralateral white dashed line $6L_j$.

In the method of the present disclosure, the vertical position defining the white dashed line count region is not necessarily the lower end of the preceding vehicle 4 as long as the position is set with reference to the preceding vehicle 4. For example, the longitudinal position may be a center position of the preceding vehicle 4. The fixed reference position does not necessarily have to be the lower end of the image as long as the fixed reference position is located below the vertical position of the preceding vehicle 4 and is fixed in the image. For example, in a case where the bonnet of the host vehicle is shown in the image, the leading end of the bonnet may be set as a fixed reference position.

Figures 3A, 3B, 3C:
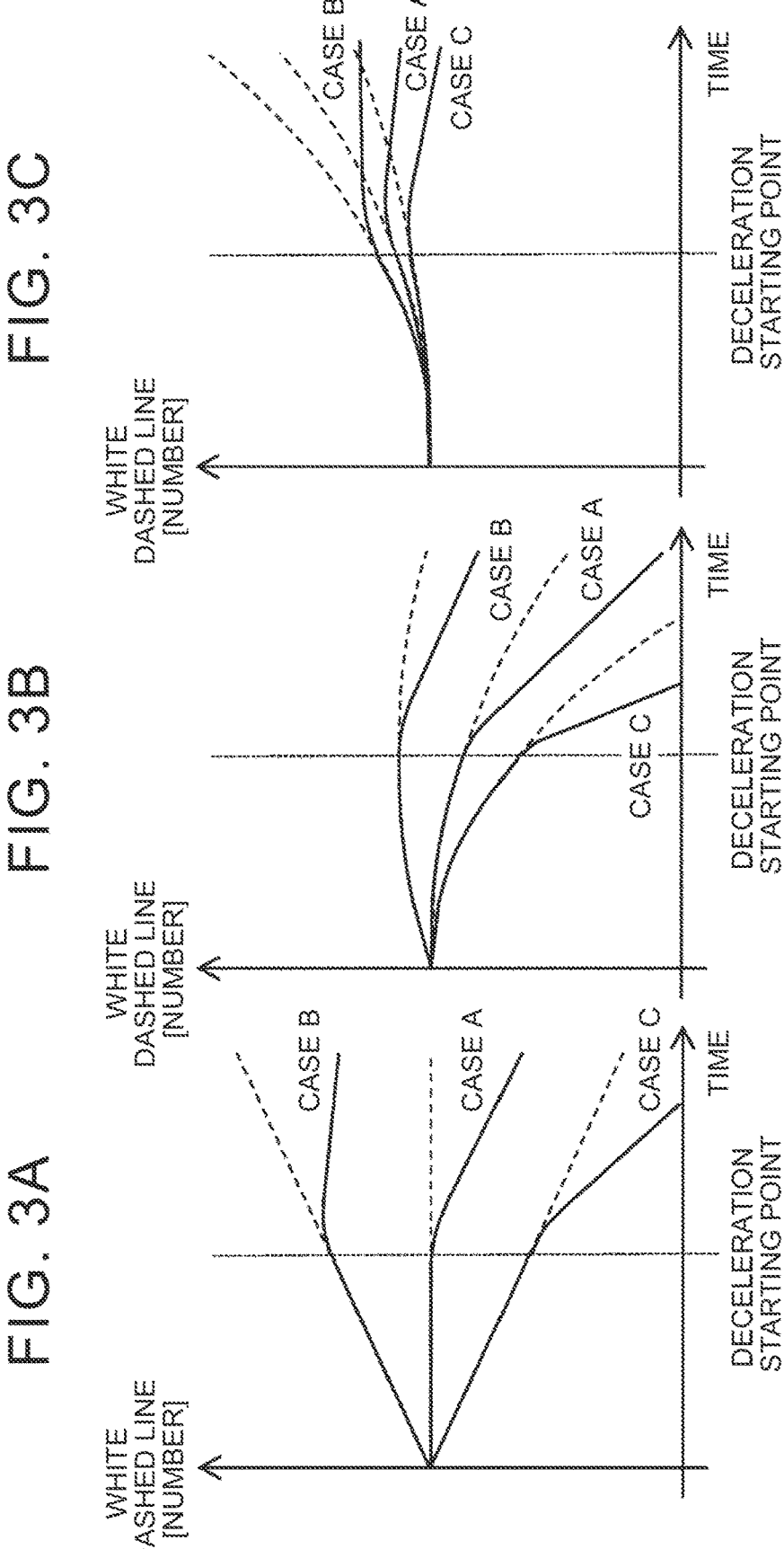
FIG. 3A is a diagram illustrating a time-series transition of the number of the white dashed lines when the preceding vehicle starts decelerating during constant-speed traveling of the host vehicle.
FIG. 3B is the time-series transition of the number of white dashed lines when the preceding vehicle starts decelerating during acceleration of the vehicle.
FIG. 3C is a diagram illustrating a time-series transition of the number of white dashed lines when a preceding vehicle starts decelerating during deceleration of the host vehicle.

FIGS. 3A, 3B and 3C show the time-series transition of the number of the white dashed lines included in the white dashed line counting area. Hereinafter, the number of white dashed lines means the number of white dashed lines included in the white dashed line count area. FIG. 3A shows the time-series transition of the number of white dashed lines when the preceding vehicle starts decelerating during the constant-speed running of the host vehicle. FIG. 3B shows a time-series transition of the number of white dashed lines when the preceding vehicle starts decelerating at the time of acceleration of the host vehicle. FIG. 3C shows the time-series transition of the number of white dashed lines when the preceding vehicle starts decelerating at the time of deceleration of the host vehicle. The number of white dashed lines changes in time series according to the speed state of the host vehicle and the speed state of the preceding vehicle.

The deceleration starting point shown in FIGS. 3A, 3B and 3C is the time at which the preceding vehicle started deceleration. The time-series transition of the number of the white dashed lines indicated by the solid line is a time-series transition in a case where the preceding vehicle starts deceleration at the deceleration starting point. The time-series transition of the number of the white dashed lines indicated by the dotted line is a time-series transition in a case where the preceding vehicle continues to travel at a constant speed. In addition, in each of FIGS. 3A, 3B and 3C, the case A shows a time-series transition of the number of the white dashed lines when the velocity of the host vehicle and the preceding vehicle is equal at the time when the time is zero. Case B shows the time series transition of the number of the white dashed lines when the speed of the preceding vehicle is higher than the speed of the host vehicle at the time when the time is zero. Case C shows the time series transition of the number of the white dashed lines when the speed of the preceding vehicle is lower than the speed of the host vehicle at the time when the time is zero.

As shown in FIGS. 3A, 3B and 3C cases, the time series transition of the number of white dashed lines varies specifically at the deceleration starting point of the preceding vehicles. Detecting the deceleration of the preceding vehicle is synonymous with detecting a specific deceleration starting point from the time series transition of the number of white dashed lines. However, as is clear from FIGS. 3A, 3B and 3C comparison, the time-series transition of the number of the white dashed lines shows different aspects depending on the velocity condition of the host vehicle. In view of such characteristics, in the method according to the present embodiment, the deceleration of the preceding vehicle is detected on the basis of the time-series transition of the number of the white dashed lines and the speed information of the host vehicle. The speed information of the host vehicle includes at least one of information on the speed of the host vehicle and information on the acceleration.

There are at least two methods for detecting the deceleration of the preceding vehicle based on the time series transition of the number of white dashed lines and the speed information of the host vehicle. The first deceleration detection method is a method of standardizing the time-series transition of the number of white dashed lines using the speed information of the host vehicle, and detecting the deceleration starting point from the time-series transition of the number of standardized white dashed lines. The second deceleration detection method is a method of estimating a time-series transition of the number of the white dashed lines on the basis of the speed information of the host vehicle when the preceding vehicle is assumed to be at a constant speed, and detecting a deceleration starting point from a difference between the estimated time-series transition of the number of the white dashed lines and the actual time-series transition of the number of the white dashed lines.

The first deceleration detection method will be described in detail. The difference in the speed of the preceding vehicle with respect to the speed of the host vehicle represents the time rate of change of the distance from the host vehicle to the preceding vehicle. Since the time change rate of the distance from the host vehicle to the preceding vehicle corresponds to the time change rate of the number of the white dashed lines, the time change rate of the number of the white dashed lines corresponds to the difference in the speed of the preceding vehicle with respect to the speed of the host vehicle. The time change rate of the time change rate of the number of white dashed lines corresponds to a difference in acceleration of the preceding vehicle with respect to acceleration of the host vehicle. Therefore, information on acceleration or deceleration of the preceding vehicle can be obtained by correcting the time change rate of the time change rate of the number of white dashed lines by the acceleration of the host vehicle. Correcting the time change rate of the time change rate of the number of white dashed lines by the acceleration of the own vehicle means that the time series transition of the number of white dashed lines is standardized by the speed information of the own vehicle.

Next, the second deceleration detection method will be described in detail. The time series transition of the number of the white dashed lines when the preceding vehicle continues to travel at a constant speed can be estimated from the speed and acceleration of the host vehicle. The time-series transition of the number of the white dashed lines indicated by the dotted lines in FIGS. 3A, 3B and 3C is a time-series transition when it is assumed that the preceding vehicle estimated from the speed data of the host vehicle is at a constant speed. On the other hand, the time series transition of the number of the white dashed lines indicated by the solid lines in FIGS. 3A, 3B and 3C is the time series transition of the number of the actual white dashed lines counted in the video of the camera. While the preceding vehicle is traveling at a constant speed, the time-series transition of the actual number of white dashed lines substantially coincides with the time-series transition when the preceding vehicle is assumed to be at a constant speed. However, at the time when the preceding vehicle starts decelerating, a deviation starts to occur between the time-series transition of the actual number of white dashed lines and the time-series transition in the case where the preceding vehicle is assumed to be at a constant speed. Therefore, it is possible to detect, as the deceleration starting point of the preceding vehicle, a time point at which the difference in the number of the white dashed lines between the actual and assumed values becomes equal to or larger than a predetermined value.

The first deceleration detection method and the second deceleration detection method described above can be used in combination. For example, when the deceleration starting point of the preceding vehicle is detected by the first deceleration detection method and the deceleration starting point of the preceding vehicle is detected by the second deceleration detection method, it may be determined that the preceding vehicle has decelerated. According to such a combination, it is possible to improve the detection accuracy of the deceleration of the preceding vehicle. In addition, when the deceleration starting point of the preceding vehicle is detected by the first deceleration detection method or the deceleration starting point of the preceding vehicle is detected by the second deceleration detection method, it may be determined that the preceding vehicle has decelerated. By using the two deceleration detection methods in combination, it is possible to prevent a detection omission of deceleration of the preceding vehicle and a delay in detection.

There is also a third deceleration detection method that can be applied only in a situation where the host vehicle is decelerating. As shown in FIG. 3C, when the host vehicle is decelerating, the number of white dashed lines tends to increase in time series, but when the preceding vehicle decelerates, the increasing tendency becomes gentle. Finally, the time-series transition of the number of the white dashed lines becomes constant or decreasing. Therefore, when it is determined from the speed information of the host vehicle that the host vehicle is decelerating, it may be determined that the preceding vehicle has decelerated when the time-series transition of the number of white dashed lines becomes constant or when a decreasing trend is observed in the time-series transition. The third deceleration detection method may be combined with the first deceleration detection method or with the second deceleration detection method. By using the third deceleration detection method in combination, it is possible to prevent a detection omission or a detection delay of the deceleration of the preceding vehicle in a situation where the host vehicle is decelerating.

FIG. 4 is a flowchart illustrating a method according to the present embodiment. The procedure of the method according to the present embodiment will be described with reference to this flowchart together with FIG. 1.

S01 is to recognize the preceding vehicle 4 with an in-vehicle monocular camera, and to acquire the lower end of the images of the preceding vehicle 4 as the longitudinal position y1 of the preceding vehicle 4. S02 is to recognize the white dashed line 6L, 6R on the road surface by the in-vehicle monocular camera. However, the white dashed line 6L, 6R is a pair of white dashed lines that define a lane on which the subject vehicle is traveling. The image used for the recognition of the white dashed line 6L, 6R in S02 is an image used for the recognition of the preceding vehicles 4 in S01. S01 and S02 may be executed in the reverse order or may be executed simultaneously.

S03 is to count the number of white dashed lines 6L, 6R between the longitudinal position y1 of the preceding vehicles 4 and the fixed reference position y2 of the lower end of the images. S04 is to detect the deceleration of the preceding vehicle 4 based on the time-series transition of the number of the white dashed line 6L, 6R counted by S03 and the velocity data of the host vehicle. For example, the first to third deceleration detection methods described above are used to detect the deceleration of the preceding vehicle 4.

By executing the above S01 to S04, according to the methods of the present embodiment, it is possible to detect the deceleration of the preceding vehicle 4 without relying on detecting the lighting of the brake lamp of the preceding vehicle 4.

2. Device for Detecting Deceleration of a Preceding Vehicle

Figure 5:
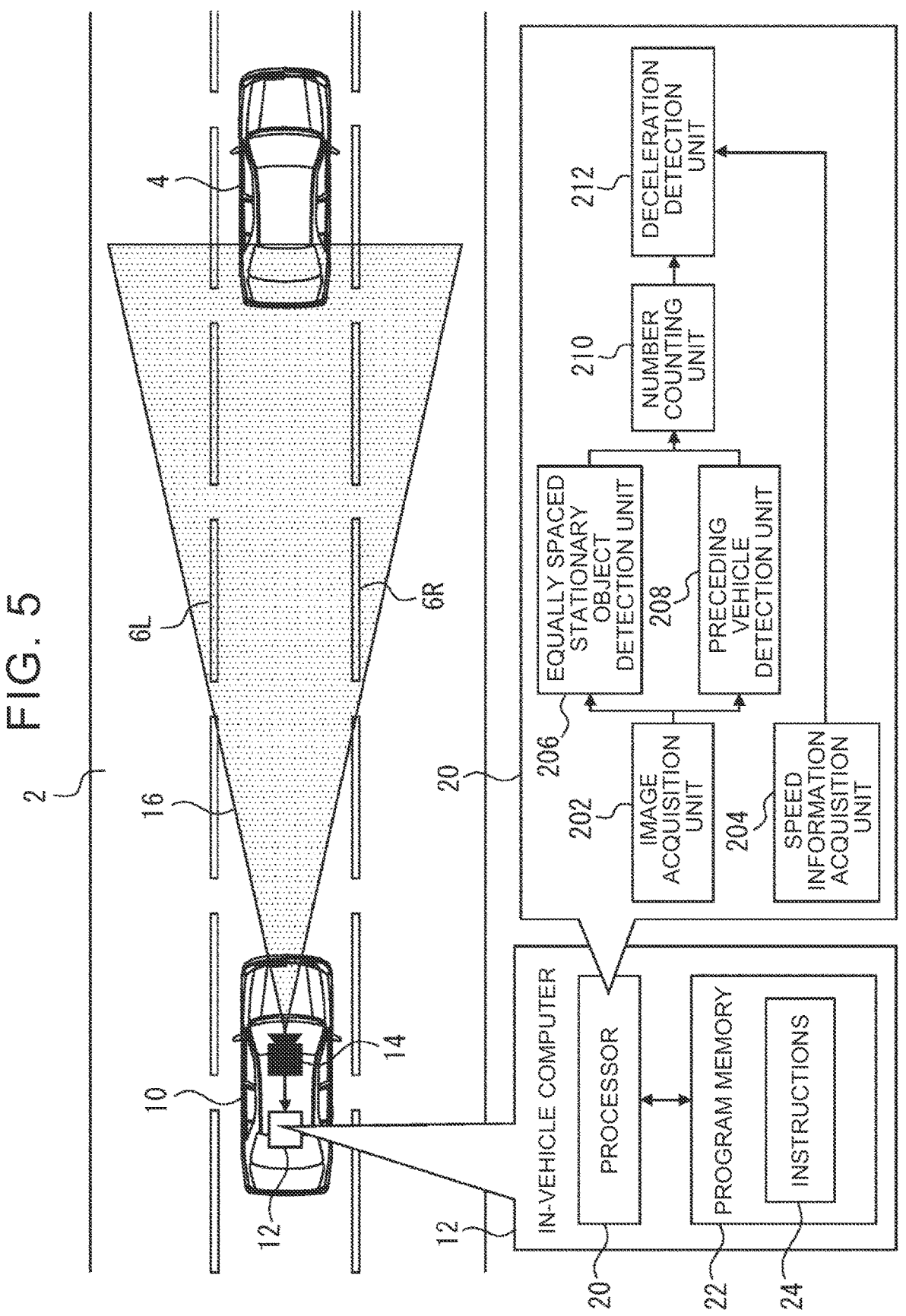
FIG. 5 is a diagram illustrating a configuration of an apparatus for detecting deceleration of a preceding vehicle according to an embodiment of the present disclosure.

Next, an apparatus in which the method according to the present embodiment is implemented will be described. FIG. 5 is a diagram illustrating a configuration of an apparatus for detecting deceleration of a preceding vehicle according to an embodiment of the present disclosure (hereinafter, referred to as an apparatus according to the present embodiment).

The vehicle 10 to which the apparatus according to the present embodiment is applied may be a manually-driven vehicle driven by a driver on the vehicle 10, or may be an automatically-driven vehicle driven by an automated driving system. For example, when the device according to the present embodiment is applied to an autonomous vehicle equipped with a LiDAR and a monocular camera, the deceleration of the preceding vehicle 4 can be detected in a situation where LiDAR is malfunctioning or in a situation where the accuracy of LiDAR is deteriorated, such as in rainy weather. Further, the vehicle 10 to which the apparatus according to the present embodiment is applied may be a remote driving vehicle that is remotely driven from a remote cockpit using wireless communication. In the remote driving, since the speed feeling of the operator with respect to the preceding vehicle 4 is weak, a high effect can be expected by applying the apparatus according to the present embodiment. Hereinafter, the vehicle 10 is referred to as an own vehicle for distinguishing from the preceding vehicle 4.

The apparatus according to the present embodiment includes an in-vehicle computer 12 and a monocular camera 14 mounted on the host vehicle 10. The monocular camera 14 is mounted toward the front of the host vehicle 10 so as to photograph the front of the host vehicle 10. An image of the front field of view 16 captured by the monocular camera 14 is input to the in-vehicle computer 12. The in-vehicle computer 12 includes a processor 20 and a program memory 22 coupled to the processor 20. The program memory 22 is a computer-readable recording medium. The program memory 22 stores a plurality of instructions 24 executable by the processor 20.

The instructions 24 stored in the program memory 22 include instructions for detecting the deceleration of the preceding vehicle 4. When the instructions are executed by the processor 20, the processor 20 functions as an image acquisition unit 202, a speed information acquisition unit 204, an equally spaced stationary object detection unit 206, a preceding vehicle detection unit 208, a number counting unit 210, and a deceleration detection unit 212.

The image acquisition unit 202 is configured to capture an image of the forward field of view 16 of the host vehicle 10 captured by the monocular camera 14. The speed information acquisition unit 204 is configured to acquire speed information of the host vehicle 10 from a speed sensor (not shown) mounted on the host vehicle 10, for example, a wheel speed sensor. The speed information includes information on the speed and information on the acceleration.

The equally spaced stationary object detection unit 206 is configured to detect equally-spaced stationary objects provided at regular intervals along the road 2 from the image acquired by the image acquisition unit 202. Examples of the equidistant stationary object to be detected include a pawl cone separating a lane, a dot line drawn inside a lane boundary line, and a leg of a guardrail, in addition to a white dashed line. When the detection target is a white dashed line, an edge-based white line recognition technique may be used as a method of detecting a white dashed line, or a recognizer represented by deep learning may be used. In the case of a road having a plurality of lanes, a plurality of white dashed lines is recognized from the image. The equally spaced stationary object detection unit 206 is configured to group the white dashed line 6R, 6L that define the lane on which the host vehicle 10 travels.

The preceding vehicle detection unit 208 is configured to detect the preceding vehicle 4 from the image acquired by the image acquisition unit 202. The preceding vehicle 4 is a vehicle that travels in a lane defined by a white dashed line 6R, 6L among vehicles traveling in front of the host vehicle 10. When a plurality of vehicles traveling in the lane defined by the white dashed line 6R, 6L is recognized, the vehicle closest to the host vehicle 10 is the preceding vehicle. As a detection method of the preceding vehicle 4, for example, a recognizer typified by deep learning can be used. The preceding vehicle detection unit 208 is configured to acquire the lower end of the preceding vehicle 4 in the vertical direction of the image as the vertical position of the preceding vehicle 4, and set a section from the vertical position of the preceding vehicle 4 to the fixed reference position in the image as a white line count area.

The number counting unit 210 is configured to count the number of the white dashed line 6R, 6L included in the white line counting area set by the preceding vehicle detection unit 208 among the white dashed line 6R, 6L grouped by the equally spaced stationary object detection unit 206. Depending on the state of the white dashed line 6R, 6L appearing in the images, the number counting unit 210 counts the number of the white dashed line 6R, 6L by using the methods described with reference to FIGS. 2A, 2B, and 2C.

The deceleration detection unit 212 is configured to detect the deceleration of the preceding vehicle 4 based on the time-series transition of the number of the white dashed line 6R, 6L counted by the number counting unit 210 and the speed information of the host vehicle 10 acquired by the speed information acquisition unit 204. Between the time series transition of the number of the white dashed lines 6R, 6L and the velocity data of the host vehicle 10, there are combinations represented in the respective cases of FIGS. 3A, 3B and 3C. The deceleration detection unit 212 is configured to be able to detect the deceleration starting point of the preceding vehicle 4 in all combinations thereof. For example, the deceleration detection unit 212 detects the deceleration starting point of the preceding vehicle 4 using any one of the above-described first to third deceleration detection methods.

3. Other

The method according to the present embodiment can also be applied to detection of acceleration of a preceding vehicle. That is, it is also possible to detect the acceleration of the preceding vehicle from the number of white dashed lines included in the white line count area and the speed information of the host vehicle. This is because, as in the case where the preceding vehicle decelerates, the time-series transition of the number of the white dashed lines greatly changes at the acceleration start point of the preceding vehicle.

What is claimed is:

1. A device comprising:

a monocular camera configured to capture an image of an area forward of a host vehicle traveling in a lane;

a processor; and a memory that is coupled to the processor and that stores a plurality of instructions that are executable by the processor and that cause the processor to execute processes including:

detecting a preceding vehicle traveling in the same lane as the host vehicle and a plurality of equally-spaced stationary objects arranged at regular intervals along a road from the image captured by the monocular camera;

grouping, from the plurality of equally-spaced stationary objects, a stationary object group defining the lane in which the host vehicle travels;

acquiring speed information of the host vehicle;

counting, from the stationary object group, the number of the stationary objects included in a section from a longitudinal position of the preceding vehicle to a fixed reference position located rearward of the longitudinal position in the image;

correcting first time-series change of the number of the counted stationary objects based on the speed information;

detecting a first specific deceleration starting point of the preceding vehicle based on the corrected first time-series change;

estimating, based on the speed information, second time-series change of the number of the counted stationary objects assuming that the preceding vehicle travels at a constant speed;

detecting a second specific deceleration starting point of the preceding vehicle based on a difference between the estimated second time-series change and actual time-series change of the number of the counted stationary objects; and detecting deceleration of the preceding vehicle based on a combination of the first specific deceleration starting point and the second specific deceleration starting point.

2. A method executed by an in-vehicle computer, the method comprising:

detecting a preceding vehicle traveling in the same lane as a host vehicle and a plurality of equally-spaced stationary objects arranged at regular intervals along a road from an image of an area forward of the host vehicle traveling in a lane, the image being captured by a monocular camera mounted on the host vehicle, the preceding vehicle traveling in the same lane as the host vehicle;

grouping, from the plurality of equally-spaced stationary objects, a stationary object group defining the lane in which the host vehicle travels;

acquiring speed information of the host vehicle;

counting, from the stationary object group, the number of the stationary objects included in a section from a longitudinal position of the preceding vehicle to a fixed reference position located rearward of the longitudinal position in the image;

correcting first time-series change of the number of the counted stationary objects based on the speed information;

detecting a first specific deceleration starting point of the preceding vehicle based on the corrected first time-series change;

estimating, based on the speed information, second time-series change of the number of the counted stationary objects assuming that the preceding vehicle travels at a constant speed;

detecting a second specific deceleration starting point of the preceding vehicle based on a difference between the estimated second time-series change and actual time-series change of the number of the counted stationary objects; and detecting deceleration of the preceding vehicle based on a combination of the first specific deceleration starting point and the second specific deceleration starting point.

3. A non-transitory storage medium storing instructions that are executable by an in-vehicle computer and that cause the in-vehicle computer to perform functions comprising:

detecting a preceding vehicle traveling in the same lane as a host vehicle and a plurality of equally-spaced stationary objects arranged at regular intervals along a road from an image of an area forward of the host vehicle traveling in a lane, the image being captured by a monocular camera mounted on the host vehicle, the preceding vehicle traveling in the same lane as the host vehicle;

grouping, from the plurality of equally-spaced stationary objects, a stationary object group defining the lane in which the host vehicle travels;

acquiring speed information of the host vehicle;

counting, from the stationary object group, the number of the stationary objects included in a section from a longitudinal position of the preceding vehicle to a fixed reference position located rearward of the longitudinal position in the image;

correcting first time-series change of the number of the counted stationary objects based on the speed information;

detecting a first specific deceleration starting point of the preceding vehicle based on the corrected first time-series change;

estimating, based on the speed information, second time-series change of the number of the counted stationary objects assuming that the preceding vehicle travels at a constant speed;

detecting a second specific deceleration starting point of the preceding vehicle based on a difference between the estimated second time-series change and actual time-series change of the number of the counted stationary objects; and detecting deceleration of the preceding vehicle based on a combination of the first specific deceleration starting point and the second specific deceleration starting point.

4. The device according to claim 1, wherein, in a case where the processor determines that the host vehicle decelerates based on the speed information of the host vehicle, and third time-series change of the number of the counted stationary objects indicates a constant trend or a decreasing trend, the processor is configured to:

perform an estimation of whether the preceding vehicle decelerates; and detect deceleration of the preceding vehicle based on a combination of the first specific deceleration starting point, the second specific deceleration starting point, and the performed estimation.

\* \* \* \* \*